Feb. 6, 1940.  A. P. J. BOUDREAU  2,189,660
POWER LEVEL INDICATOR
Filed April 8, 1937  2 Sheets-Sheet 2
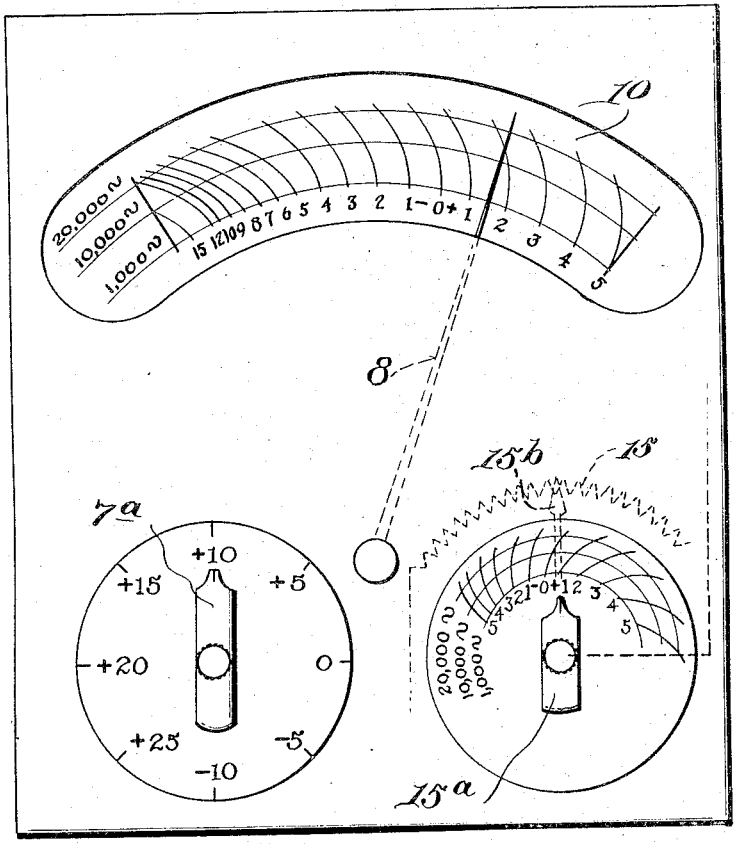
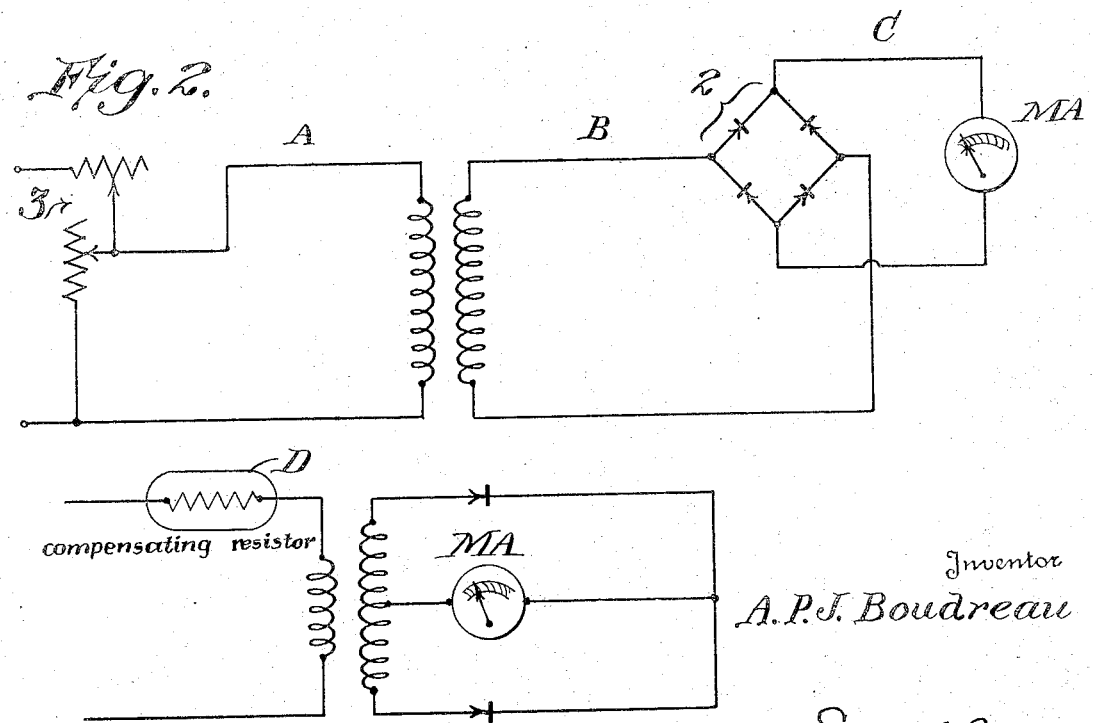

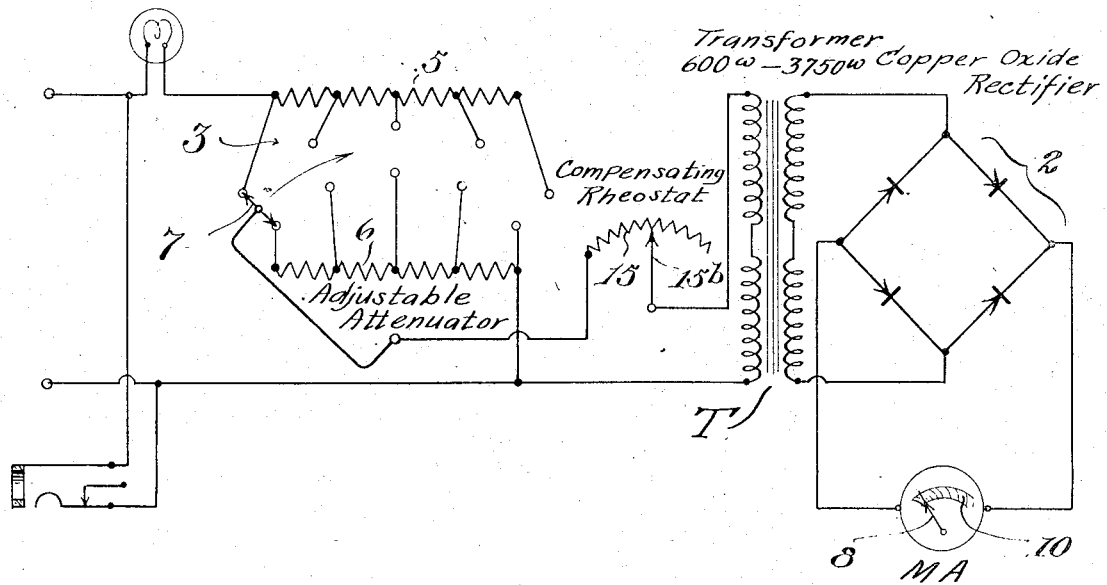
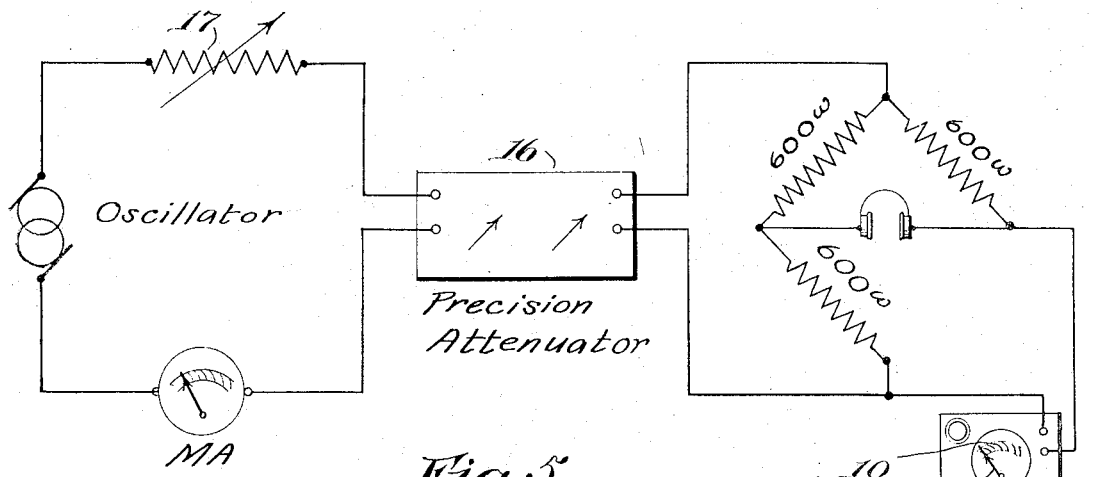

Patented Feb. 6, 1940

2,189,660

UNITED STATES PATENT OFFICE 2,189,660

POWER LEVEL INDICATOR

Anthony P. J. Boudreau, Garden City, N. Y., assignor to The Western Union Telegraph Company, New York, N. Y., a corporation of New York Application April 8, 1937, Serial No. 135,791

4 Claims. (Cl. 175—183)

This invention relates to electrical measuring apparatus and particularly to apparatus suitable for measuring small alternating current levels. Its principal use is in the measurement of power levels, attenuation, amplifier gain and in other general measuring functions in communication systems.

The apparatus embodies a sensitive direct current microammeter and a rectifier of the copper oxide type for converting the small alternating currents to be measured into direct currents adaptable for operating the meter. I have found that the resistance of the rectifier increases with decreasing current at a fairly uniform rate. It is obvious that in calibrating the meter this variable resistance must be considered. Moreover the impedance of the apparatus would vary with the current being measured and hence would result in an error due to a mismatching of the impedances of the instrument and the line.

One object of this invention is to provide means to remedy said defects by introducing an adjustable compensating rheostat in such a manner and so calibrated in terms of the meter readings that the sum of the resistance of the rectifier, meter and rheostat shall remain constant at the desired value for all values of current in the compensated range. Another object is to correct for the error in the meter reading due to the capacity reactance of the rectifiers which causes the meter to read lower than the true reading as the frequency increases and to provide an instrument which may be used over a range of frequencies.

The invention will be understood from the following description in connection with the accompanying drawings in which—

Figure 1 is a schematic circuit diagram illustrating one arrangement embodying the invention.

Figs. 2 and 3 are diagrams showing modifications embodying the invention.

Fig. 4 is an enlarged plan view of the front face of the meter.

Fig. 5 is a diagram illustrating the manner of calibrating the elements of the apparatus.

The principle of the instrument is based upon the flow of current through a fixed resistance (conveniently 600 ohms), the meter being preferably calibrated in terms of $I^2R$ or power, in milliwatts. It is further convenient to refer this power to a standard reference level, such as one milliwatt and to calibrate the meter in terms of power levels with respect to the reference standard.

An attenuation network which serves as multiplier for increasing the range of the instrument is connected in the input and is designed to maintain the input impedance approximately constant regardless of setting. A transformer T may be required between the network and the copper oxide rectifier 2 for matching the impedance of the rectifier-meter combination to the impedance of the line.

The adjustable attenuator network 3 consists of a variable series resistor branch 5 and a variable shunt resistor branch 6. The micro-ammeter MA is provided with an indicator 8 adapted to move over a suitably graduated scale 10. The meter scale and the attenuation network are preferably calibrated in logarithmic electrical transmission units, preferably decibels, for any desired load impedance, say 600 ohms. The total power level is obtained by adding the scale reading to the attenuator multiplier reading. The instrument will thus represent the level of so many decibels above or below the reference level, as for instance one milliwatt.

While it has been the purpose in prior power level meters to so design the series and shunt branches of the adjustable attenuator or multiplier network that the total impedance of the network and the meter should remain constant for all adjustments, I have found that the resistance of the rectifier increases with decreasing current, although the variation is fairly uniform. It is apparent therefore that the meter calibration must take this variable resistance into account and also that the impedance presented to the line would vary in accordance with the current being measured. Even if the first error in the rectifier could be corrected in the calibration, the second defect would result in an error due to a mismatching of the instrument and the line. My present invention overcomes both of said defects by introducing an adjustable compensating rheostat 15, which may be calibrated in terms of the meter reading. As a result of this compensating action, the sum of the resistance of the rectifier, meter and rheostat remains constant at the desired value for all values of current in the compensated range.

The calibration of the instrument, which requires a simultaneous calibration of the meter scale and the compensating rheostat, is readily accomplished by means of a bridge circuit arrangement as shown in Fig. 5. The input level to the precision attenuator 16 is adjusted to a predetermined amount by means of the adjustable rheostat 17, and the bridge is then balanced by means of the compensating rheostat 15, in the decibel meter Db, the other arm resistances being fixed at 600 ohms. When a balance is obtained, both the meter scale and the compensating rheostat dial may be marked for that particular power level. Adjustment of the precision attenuator will control the level at the Db meter. It should be noted that the level delivered to the meter will be 6 db. below that of the precision attenuator output because of the 50% loss of current in the bridge circuit. The dial of the compensating rheostat 15 is thus calibrated to the same scale as the meter, the added resistance at each setting being just sufficient to maintain the resistance of the combination at the required constant value. In using the meter the operator sets the dial knob 7ᵃ of the attenuator to a suitable multiplier or range of measurement and then sets the contact arm 15ᵇ of the compensating rheostat by means of the knob 15ᵃ, to approximately the same reading as that of the meter before noting the meter reading.

As noted above, the capacity reactance of the rectifier increases with the frequency so that with increasing frequency the meter tends to read lower than the true reading. By calibrating both the meter scale and the dial of the compensating rheostat at a number of frequencies, the utility of the instrument can be extended over a range of frequencies. I have indicated on the face plate of the meter shown in Fig. 4 the scale markings of the meter dial 10 and of the compensating rheostat 15, calibrated at three appropriately spaced frequencies, thereby making the instrument serviceable for any frequency within this range.

The compensating rheostat 15 may be located at different positions with relation to the other elements of the instrument. Thus it may be connected at position A, B or C as indicated in Fig. 3 and may be connected in series or in parallel or any combination of the two which will produce the desired compensation. Again four matched resistances may be employed, one located in each arm of the bridge rectifier.

Instead of the adjustable compensation rheostat, as shown in Fig. 1, I may employ a compensating element having natural characteristics complementary to that of the rectifier. A filament of fine tungsten wire may be used for this purpose. It may be located in the position indicated at D in the arrangement illustrated in Fig. 3, which shows a different arrangement of the rectifier elements.

I have shown and described a preferred form of electrical measuring apparatus embodying my invention and modifications thereof, but it will be evident to engineers skilled in this art that various changes and modifications may be made therein within the scope of the appended claims.

I claim:

1. In a power-level indicator a source of alternating electric power and an indicating apparatus comprising a rectifier receiving current from said source, and having the characteristics of decreasing in resistance with increasing current and of decreasing its direct current output in accordance with increases in the frequency of the alternating current supplied thereto, an electrical measuring instrument receiving direct current from said rectifier and having a plurality of scales calibrated in logarithmic power units, each scale corresponding to a particular frequency, and a compensating variable resistance in series circuit relation with the rectifier, said resistance being calibrated at predetermined frequencies and at definite power levels to correspond with said scale calibrations of the rectifier so that with variations of current at one of said frequencies, and with the adjustment of the resistance corresponding to the indicated scale calibration at said frequency, the resistance of said apparatus will remain substantially constant at a fixed value.

2. The method of calibrating a measuring instrument provided with an adjustable compensating resistance which comprises inserting the instrument and compensating resistance in one arm of a Wheatstone bridge having fixed like resistances in the other three arms connecting a source of electrical energy to said bridge, causing a known current to flow through said instrument and compensating resistance, balancing the bridge by adjusting the compensating resistance and then simultaneously marking the scales of the instrument and the resistance for said predetermined current value.

3. In the method set forth in claim 2, calibrating for different frequencies, comprising the further step of simultaneously adjusting the compensating resistance to balance the bridge at the desired frequencies while known currents flow through the instrument and simultaneously marking the scales of the instrument and the resistance for said value of current at said frequencies.

4. Apparatus for measuring alternating current electric power, comprising a rectifier for receiving current to be measured, said rectifier being characterized by decreasing resistance with increasing current, an electrical measuring instrument connected to receive direct current from said rectifier, said instrument being provided with a scale calibrated in logarithmic power units, and a compensating variable rheostat connected in series circuit with the rectifier, said compensating resistance being calibrated at definite power levels to correspond with said scale calibrations of the rectifier, so that with the adjustment of the resistance corresponding to the indicated scale calibration, the sum of the resistance of the rectifier, the instrument and rheostat remain substantially constant for all values of current in the compensated scale range.

ANTHONY P. J. BOUDREAU.